(12) United States Patent
Collins et al.

(10) Patent No.: US 11,604,770 B2
(45) Date of Patent: Mar. 14, 2023

(54) METHODS AND SYSTEMS FOR SECURE PRODUCT TRACKING DATA STORAGE AND VERIFICATION

(71) Applicant: MASTERCARD INTERNATIONAL INCORPORATED, Purchase, NY (US)

(72) Inventors: Robert Collins, Blackrock (IE); Stephen Elder, County Dublin (IE); David James Fleming, Wicklow (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 376 days.

(21) Appl. No.: 16/697,408

(22) Filed: Nov. 27, 2019

(65) Prior Publication Data
US 2020/0174973 A1  Jun. 4, 2020

(30) Foreign Application Priority Data

Nov. 30, 2018  (EP) ..................................... 18209593

(51) Int. Cl.
*G06F 16/182* (2019.01)
*G06F 16/13* (2019.01)
*G06Q 20/20* (2012.01)

(52) U.S. Cl.
CPC .......... *G06F 16/182* (2019.01); *G06F 16/137* (2019.01); *G06Q 20/203* (2013.01); *G06Q 20/209* (2013.01)

(58) Field of Classification Search
CPC ... G06F 16/182; G06F 16/137; G06Q 20/203; G06Q 20/209; G06Q 20/3827; G06Q 10/0833; G06Q 10/0837
See application file for complete search history.

(56) References Cited

U.S. PATENT DOCUMENTS

| | | | |
|---|---|---|---|
| 7,657,740 B2 | 2/2010 | Numao et al. | |
| 8,688,524 B1 | 4/2014 | Ramalingam et al. | |
| 9,774,578 B1 * | 9/2017 | Ateniese | ............... H04L 63/061 |
| 11,080,692 B2 * | 8/2021 | Mackie | .............. G06Q 20/3827 |

(Continued)

FOREIGN PATENT DOCUMENTS

| | | |
|---|---|---|
| CN | 108 269 351 A | 7/2018 |
| GB | 2473485 A | 3/2011 |

(Continued)

OTHER PUBLICATIONS

"Securing Physical Assets on the Blockchain". Proceedings of the 1st Workshop on Cryptocurrencies and Blockchains for Distributed Systems. ACM press, 2018. (Year: 2018).*

(Continued)

*Primary Examiner* — Nathan A Mitchell
(74) *Attorney, Agent, or Firm* — Panitch Schwarze Belisario & Nadel LLP

(57) ABSTRACT

The present disclosure relates to secure and verifiable storage and retrieval of data, in particular in the context of product tracking. According to one aspect there is provided a computer-implemented verifiable data storage method comprising: receiving a product serial number; receiving an account identifier; producing a non-invertible hash by operating on the product serial number and the account identifier; and causing the hash to be written to a secure distributed data store. According to another aspect there is provided a computer-implemented verification method comprising: receiving a product serial number; receiving an account identifier; producing a non-invertible hash by operating on the product serial number and the account identifier; searching a secure distributed data store for the hash; and depending on a result of the searching, providing confirmation or (Continued)

denial of the hash's presence in the secure distributed data store.

12 Claims, 4 Drawing Sheets

(56) References Cited

U.S. PATENT DOCUMENTS

| | | | |
|---|---|---|---|
| 2002/0013764 A1* | 1/2002 | Kama | G06Q 20/10 |
| | | | 705/39 |
| 2005/0131826 A1 | 6/2005 | Cook | |
| 2005/0177466 A1 | 8/2005 | Willins | |
| 2005/0261937 A1 | 11/2005 | Silverbrook et al. | |
| 2006/0149671 A1 | 7/2006 | Nix et al. | |
| 2011/0096955 A1 | 4/2011 | Voloshynovskiy et al. | |
| 2015/0371211 A1* | 12/2015 | Howe | G06Q 20/3224 |
| | | | 705/39 |
| 2017/0206532 A1 | 7/2017 | Choi | |
| 2017/0214693 A1* | 7/2017 | Bao | H04L 63/0807 |
| 2018/0096350 A1* | 4/2018 | Groarke | H04L 9/3242 |
| 2018/0189463 A1 | 7/2018 | Murphy et al. | |
| 2018/0322563 A1* | 11/2018 | Wan | G06Q 10/0833 |
| 2018/0330386 A1* | 11/2018 | Kim | H04L 63/0823 |
| 2019/0318359 A1* | 10/2019 | Arora | G06Q 20/4016 |
| 2020/0151719 A1* | 5/2020 | Sarin | G06T 7/0002 |
| 2020/0273031 A1* | 8/2020 | Narayan | H04L 9/3239 |
| 2021/0248369 A1* | 8/2021 | Kaufmann | H04L 9/3278 |

FOREIGN PATENT DOCUMENTS

| | | |
|---|---|---|
| KR | 10-2017-0113481 A | 10/2017 |
| WO | 0199063 A1 | 12/2001 |
| WO | 2006055846 A1 | 5/2006 |
| WO | 2017/195160 A1 | 11/2017 |

OTHER PUBLICATIONS

Keni, Harshith R., "Product Authentication Using Hash Chains and Printed QR Codes" (2016). Electronic Theses and Dissertations. 1121. https://openprairie.sdstate.edu/etd/1121 (Year: 2016).*

Notification of Transmittal of the International Search Report (Forms PCT/ISA/220 and PCT/ISA/210) and the Written Opinion of the International Searching Authority (Form PCT/ISA/237) dated Jan. 31, 2020, by the International Application Division Korean Intellectual Property Office in corresponding International Application No. PCT/US2019/054931. (15 pages).

Search Report dated Apr. 16, 2019, by the European Patent Office for Application No. 18209593.5.

Examination Report dated Jul. 26, 2022 issued by the European Patent Office in corresponding European Patent Application No. 18 209 593.5 (6 pages).

African et al.: "The basics of identification and barcoding for traceability GS1 AIDC Standards in Healthcare", Breakout Panel II @ Jan. 1, 2018; (78 Pages); XP055810301.

Anonymous: "Distributed hash table—Wikipedia, the free encyclopedia", Jun. 9, 2015; XP055308352; (6 Pages).

* cited by examiner

METHODS AND SYSTEMS FOR SECURE PRODUCT TRACKING DATA STORAGE AND VERIFICATION

FIELD

The present disclosure relates to secure and verifiable storage and retrieval of data, in particular in the context of product tracking.

More specifically, aspects relate to a computer-implemented verifiable data storage method, a computer-implemented verification method, a computer-implemented data storage and verification method, a computer program product comprising computer-readable instructions which, when executed by one or more processors, cause the method of the preceding aspects to be performed and a computer system configured to perform the method of the first to third aspects.

BACKGROUND

While there are now widespread standards for electronic payment, verification of purchase often still requires retention and presentation of a paper receipt, which can be easily lost or destroyed. Where product tracking data is already stored electronically, this is generally not done in a consistent way.

Systems for storing data relating to purchase, return and repair of products are diverse and inconsistently applied and implemented. They also usually rely on the robustness and security of a single computer system, allowing data to be lost or stolen. This can be a particular problem where the data includes purchase history data which consumers may wish kept private, such as pharmaceutical purchases.

Access to such data may have to be restricted, so that it may not be possible for other merchant branches in the same merchant chain as the branch in which a product was purchased to verify the purchase in order to handle a return. Similarly, authorised repair agents may not be able to directly verify purchases. The data access arrangements to implement collection of products purchased through one merchant from a third party collection point may be complex. Manufacturers may also not be able to track their products all the way down the supply chain, and may have to require the end user of a product to take additional steps such as completing and sending forms to the manufacturer to register a warrantee. Regulatory authorities and police may not have access to individual product tracking data which could be useful to them, for example to ensure proper return and disposal of unused pharmaceuticals and to tackle black market trading.

What is needed is a way of storing product tracking data in a secure, verifiable way, while permitting easy access by authorised parties where required.

SUMMARY

According to a first aspect, there is provided a computer-implemented verifiable data storage method comprising: receiving a product serial number; receiving an account identifier; producing a non-invertible hash by operating on the product serial number and the account identifier; and causing the hash to be written to a secure distributed data store.

The account identifier could comprise a primary account number (PAN) or a tokenised PAN.

Causing the hash to be written to the secure distributed data store can comprise transmitting a message comprising the hash to a node of a network which maintains the secure distributed data store.

The method can further comprise receiving ancillary data, wherein: the hash is produced by operating on the product serial number, the account identifier and the ancillary data; or the method further comprises causing the ancillary data to be written to the data store such that it is linked to the hash, optionally such that the ancillary data is passcode protected with the hash as the passcode.

The ancillary data could comprise one or more of a merchant identifier, merchant location, item price, receipt identifier, offer identifier, date, manufacturer identifier, consumer identifier, product serial number and account identifier.

Causing the hash to be written to the secure distributed data store can comprise selecting the secure distributed data store from a plurality of secure distributed data stores depending on the product serial number and/or received ancillary data.

According to a second aspect, there is provided a computer-implemented verification method comprising: receiving a product serial number; receiving an account identifier; producing a non-invertible hash by operating on the product serial number and the account identifier; searching a secure distributed data store for the hash; and depending on a result of the searching, providing a confirmation or denial of the hash's presence in the secure distributed data store.

Providing the confirmation or denial can be performed by a user output device.

The user output device could comprise one or more of a screen, indicator light, speaker, buzzer, haptic feedback device and printer (such as a thermal receipt printer comprised in an electronic point of sale, ePOS).

When a confirmation is provided, providing the confirmation can comprise providing ancillary data which has been stored in the secure distributed data store such that it is linked to the hash, optionally such that the ancillary data is passcode protected with the hash as the passcode.

Searching the secure distributed data store can comprise selecting the secure distributed data store from a plurality of secure distributed data stores depending on the product serial number and/or received ancillary data.

The method can further comprise: searching a further secure data store for a record comprising the account identifier and an additional account identifier; and in response to finding such a record: producing an additional non-invertible hash by operating on the product serial number and the additional account identifier; and searching the secure distributed data store for the additional hash; wherein providing a confirmation or denial of the hash's presence in the secure distributed data store is dependent on a result of the searching for both the hash and the additional hash.

The product serial number can be globally unique.

The product serial number can be received from an input device; and/or the account identifier can be received from an electronic point of sale, 'POS' terminal.

The input device could comprise one or more of a barcode scanner, a quick response (QR) code scanner, a radio-frequency identification (RFID) reader, a near-field communication (NFC) reader, a physical or virtual keyboard or keypad or a microphone.

According to a third aspect, there is provided a computer-implemented data storage and verification method comprising: receiving one or more non-invertible hashes; writing the one or more hashes to a secure distributed data store; at a later time, receiving a search request comprising a further non-invertible hash from a network node; comparing the further non-invertible hash with each of the one or more hashes previously written to the data store; responsive thereto, ascertaining whether the further hash matches one of the one or more hashes previously written to the secure distributed data store; and responsive to and depending on a result of the ascertaining, transmitting a confirmation or denial of the further hash to the network node.

The method could further comprise: prior to receiving the further hash, receiving ancillary data associated with the one of the one or more hashes; writing the ancillary data to the data store such that it is linked to the one of the one or more hashes, optionally such that the ancillary data is passcode protected with the one of the one or more hashes as the passcode; and in response to ascertaining that the further hash matches the one of the one or more hashes, transmitting the ancillary data to the network node.

The secure distributed data store can be a distributed ledger, optionally a blockchain, or a distributed database exposing verifiable claims.

According to a fourth aspect, there is provided a computer program product comprising computer-readable instructions which, when executed by one or more processors, cause the method of any of the first to third aspects to be performed.

According to a fifth aspect, there is provided a computer system configured to perform the method of any of the first to third aspects.

BRIEF DESCRIPTION OF THE FIGURES

Aspects of the present disclosure will now be described by way of example with reference to the accompanying figures. In the figures.

DETAILED DESCRIPTION OF THE FIGURES

The following description is presented to enable any person skilled in the art to make and use the system, and is provided in the context of a particular application. Various modifications to the disclosed embodiments will be readily apparent to those skilled in the art.

In order to track products, they are each issued with a product serial number. This may for example be present on a label on the product, e.g. in the form of a barcode or quick response (QR) code. When a product is purchased using an electronic payment method such as a credit or debit card payment or a payment-enabled device payment, an account identifier must be provided, for example a primary account number (PAN) or a tokenised PAN. It is proposed herein that the product serial number and account identifier are linked together by means of a non-invertible hashing algorithm, so that a fixed length record of the purchase is made from which neither the product serial number nor the account identifier can be obtained. The hash is then written to a distributed data store, such as a blockchain, so that it can be accessed by nodes of the distributed data store network. In this way, proof of purchase is tied to a payment instrument. It is then possible to verify that a purchase has been made by presenting the product and card or device used to make the payment, hashing the product and account identifiers according to the same algorithm as before, and searching the distributed data store for the resulting hash.

Figure 1:
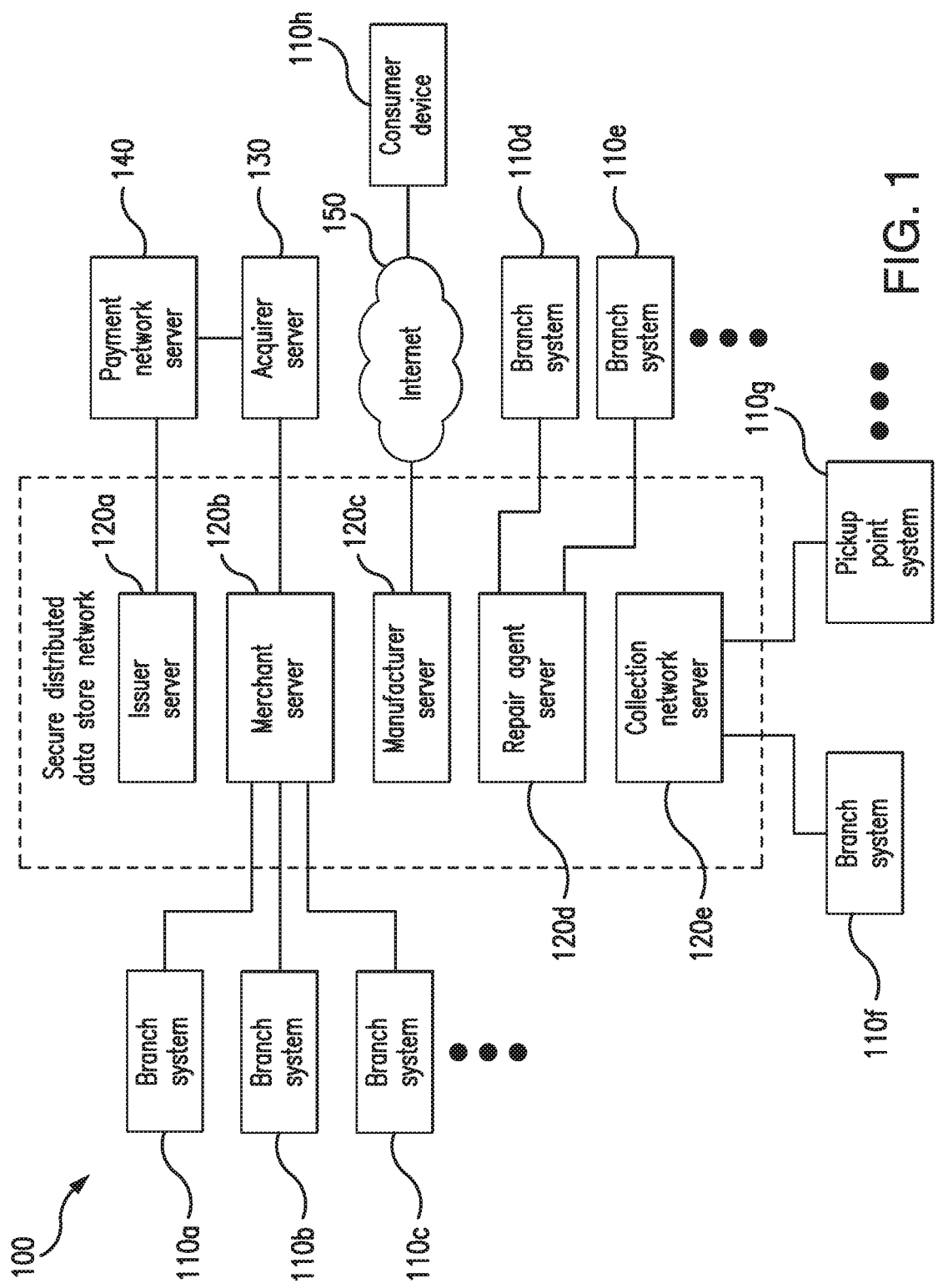
FIG. 1 schematically illustrates an example system in which the methods described herein can be used.

FIG. 1 illustrates an example system 100 in which this method can be used. A product is purchased by providing a product serial number and an account identifier to a computing system 110a of a merchant branch. A transaction request comprising these identifiers is transmitted to the main merchant server 120b for routing to the server 120a of the account issuer bank, via a server 130 of the merchant's acquirer bank and a sever 140 of a payment network with which both the issuer and the acquirer are enrolled. The issuer server 120a approves the transaction request and passes a transaction approval back to the branch system 110a via the payment network server 140, acquirer server 130 and merchant server 120b so that the consumer can take the product out of the branch.

In addition to these usual transaction request and approval message flows, a hash of the product and account identifiers is performed and the resulting hash is written to a secure distributed data store by one of the nodes 120 of a secure distributed data store network. The secure distributed data store network could for example have nodes at the issuer server 120a, merchant server 120b, a manufacturer server 120c, a repair agent server 120d and a collection network server 120e. For example, the hashing could be performed by one of the branch system 110a and the merchant server 120b and the hash could be written to the secure distributed data store by the merchant server 120b. (The arrangement shown in FIG. 1 is exemplary only; which entities are nodes of the secure distributed data store network could be different in other examples, for example the payment network server and/or a server of a regulatory or police authority could be additional nodes.)

If the consumer wishes to return the product, they can then go to any of the merchant's branches and provide the relevant branch system 110a, 110b, 110c etc. with the product and account identifiers in the same way that they did during the initial purchase in order to request verification that the product was purchased using the account identified by the account identifier. Hashing of the product and account identifiers is performed according to the same algorithm as the one used at the time of purchase and then one of the secure distributed data store network nodes 120, for example the merchant server 120b, searches the secure distributed data store for the resulting hash. Depending on the result of the search, an approval or declination of the verification request is issued to the branch system 110.

Similarly, should the consumer wish to have the product repaired by an approved repair agent, the repair agent can confirm that the product is not stolen by issuing a verification request from a repair agent branch system 110d, 110e etc. to the repair agent server 120d to check the secure distributed data store.

If the purchase was performed remotely, for example over the phone or internet, and the product needs to be sent out to the consumer, they could collect it through a collection network, for example comprising pickup concessions in convenience store branches and pickup point lockers at rail and petrol stations. They can provide their account identifier and a product serial number received in a purchase confirmation to a branch system 110f or a pickup point system 110g etc. so that a collection network server 120e, which is a node of the secure distributed data network, can perform a hash check as described above. Alternatively, provided a sufficiently high level of security is in place on the data store, the initial storage of the hash could comprise storing both the hash and the account identifier in a linked manner. In that case only the account identifier needs to be provided in order to collect the product. The product could be marked with the hash so that staff at a pickup concession can identify which product to hand over to which consumer.

If the consumer wishes to register a warranty for the product, they can use a user device 110*h* to access the manufacturer's website via the internet 150. Warrantee registration can then be approved if a hash check is successful.

Figure 2:
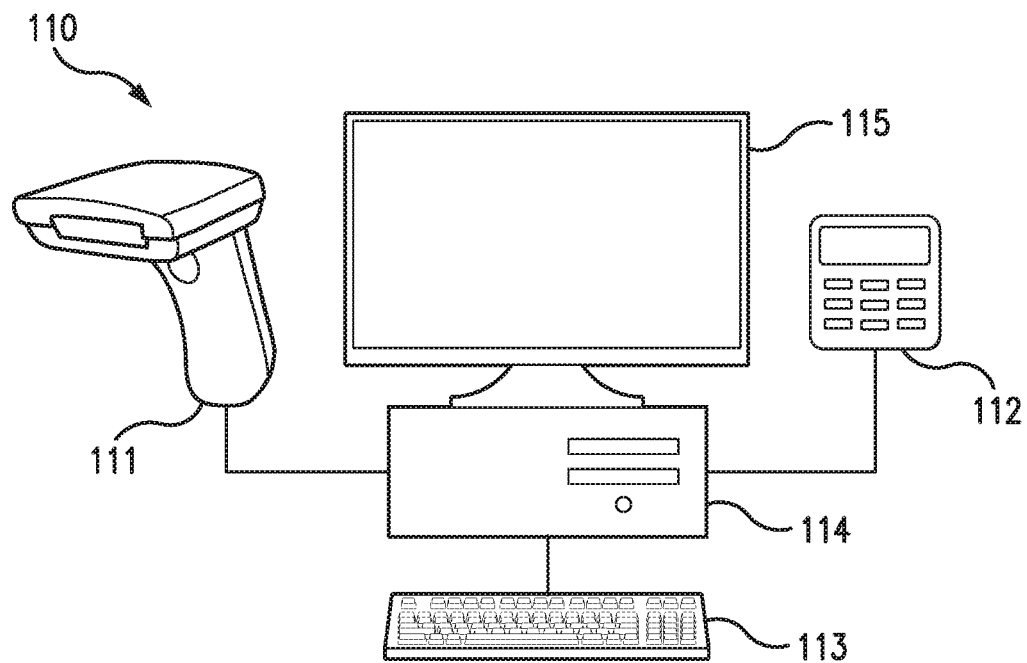
FIG. 2 illustrates an example computing system.

FIG. 2 illustrates a computer system 110 such as the merchant, repair service agent or collection network branch systems, the pickup point system or the consumer device shown in FIG. 1. It comprises one or more input devices such as a barcode scanner 111, an electronic point of sale (ePOS) terminal 112 and a keyboard 113, which all communicate with a processor unit 114. The processor unit 114 in turn communicates with one or more user output devices such as a monitor 115. The barcode scanner 111 can be used to obtain product serial numbers. The ePOS 112 can be used to obtain account identifiers, for example via near field communication (NFC) with a payment card or payment-enabled device such as a smartphone or smartwatch. The monitor 115 can be used to display approval or decline responses of verification requests.

Figure 3:
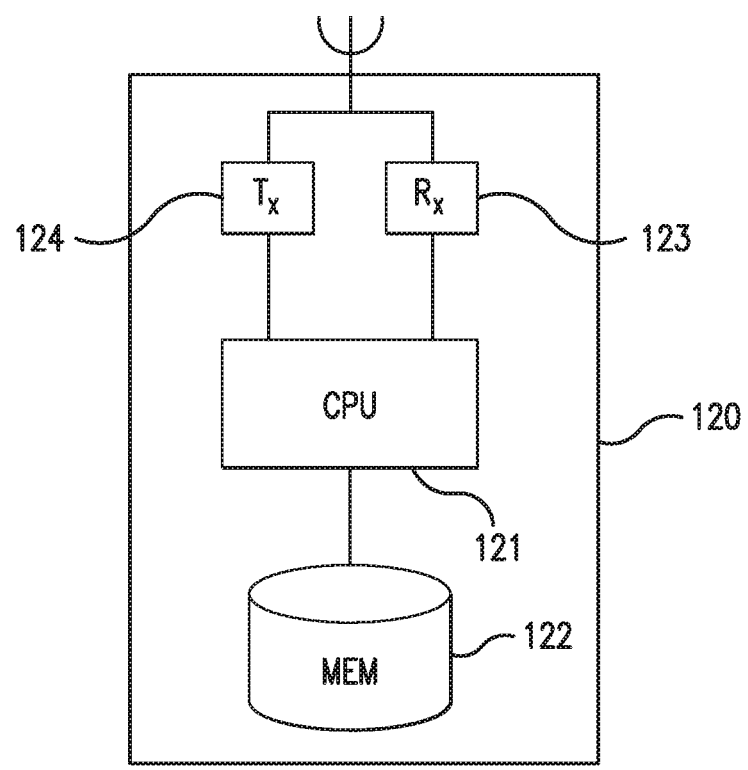
FIG. 3 illustrates an example server.

FIG. 3 illustrates a secure distributed data store network node 120 such as the issuer server 120*a*, merchant server, 120*b*, manufacturer server 120*c*, repair agent server 120*d* or collection network server 120*e* of FIG. 1. It comprises a processor 121 in communication with a memory 122, a receiver 123 and a transmitter 124.

Figure 4A:
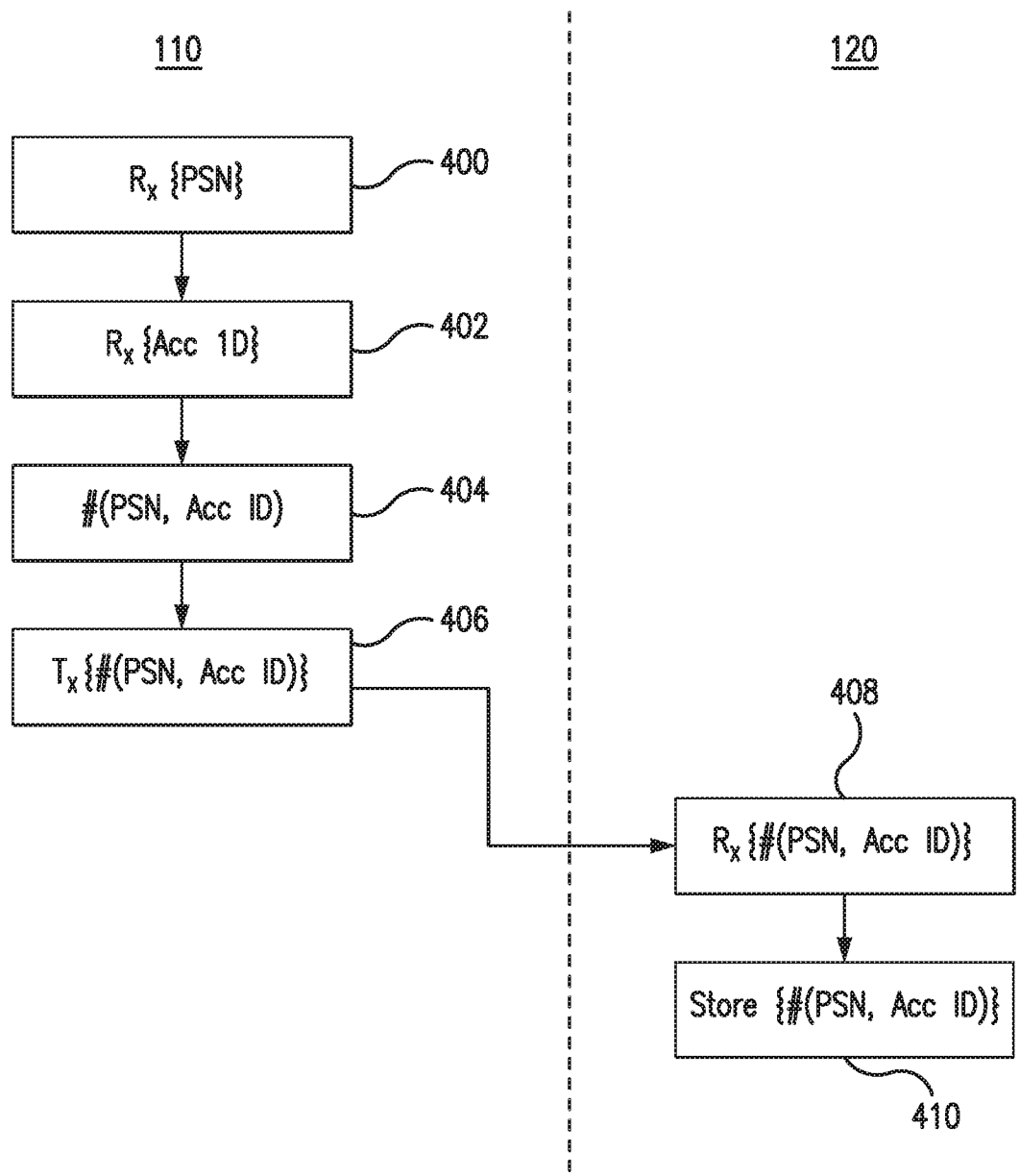
FIGS. 4A and 4B illustrate example methods.

FIG. 4A is a flowchart showing an example method for storing product tracking data. At a computing system 110 such as that shown in FIG. 2, a product serial number is received at step 400 and an account identifier is received at step 402. Steps 400 and 402 could occur in either order or simultaneously. Next, at step 404 the product serial number and account identifier are hashed and then at step 406 the hash is transmitted to a node 120 of the secure distributed data store network. (Alternatively, the product serial number and account identifier could be transmitted to the node 120 for hashing, or the computing system 110 could itself also be a node 120 of the secure distributed data store network.) At step 408 the hash is received by the node 120, which then writes it to the secure distributed data store at step 410.

Figure 4B:
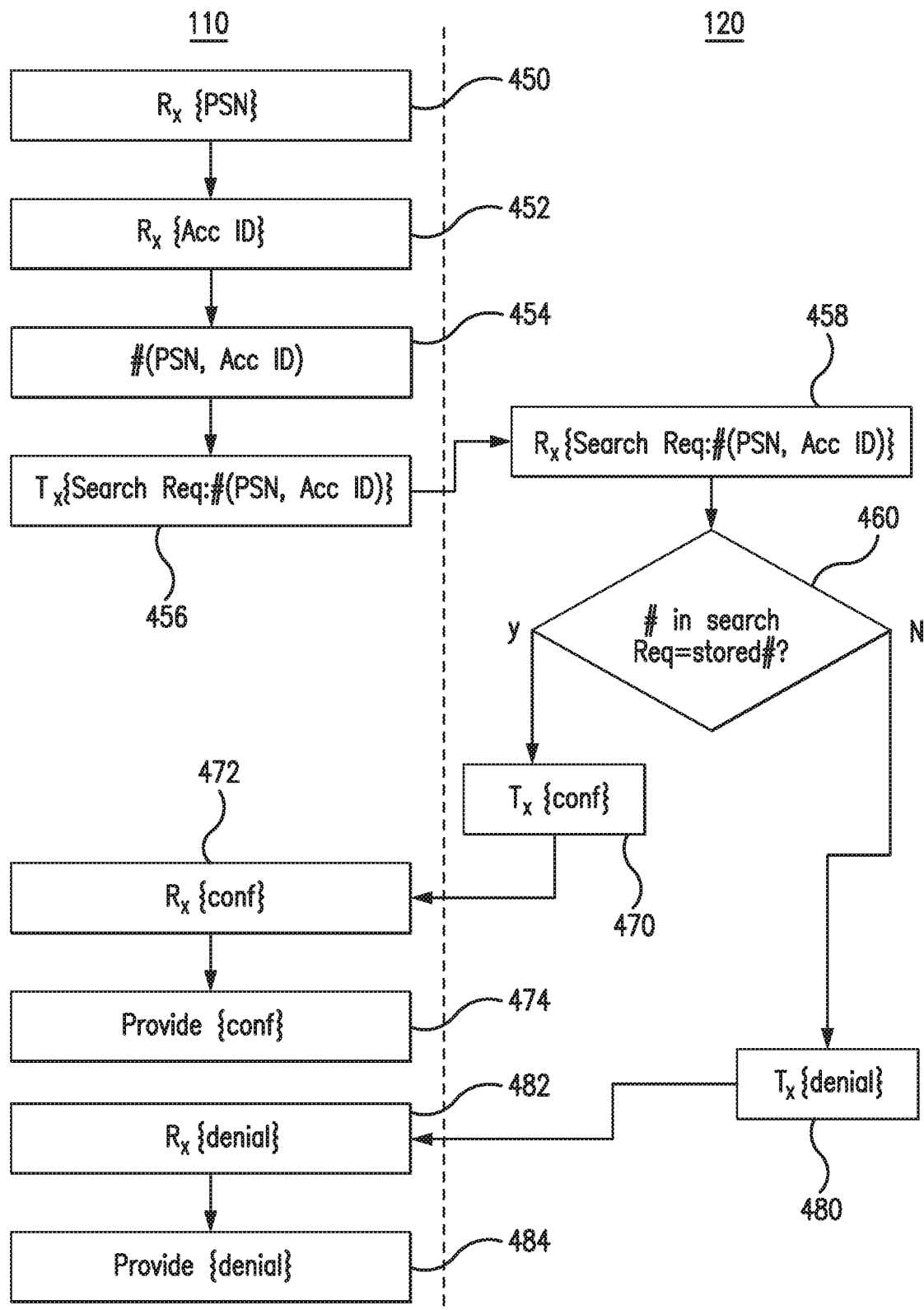

FIG. 4B is a flowchart showing an example method for verifying product tracking data, which can be performed at a time later than the method of FIG. 4A. At step 450 a computing system 110 (which may be the same computing system 110 as that of FIG. 4A, or a different one) receives a product serial number. At step 452 it receives an account identifier. Again, these steps could be performed in either order or simultaneously. The product serial number and account identifier are hashed at step 454 and the hash is transmitted to a node 120 of the secure distributed data store network (which could be the same node 120 as that of FIG. 4A, or a different one) in a verification request at step 456. (Alternatively, the product serial number and account identifier could be transmitted to the node 120 for hashing, or the computing system 110 could itself also be a node 120 of the secure distributed data store network.) At step 458 the verification request is received by the node 120, which searches the secure distributed data store for the received hash at step 460. If the received hash matches a stored hash then at step 470 the node 120 transmits a confirmation to the computing system 110. This is received at step 472 and a confirmation notification is provided to a user of the computing system 110 at step 474. If the received hash does not match any stored hash then at step 480 the node 120 transmits a denial to the computing system 110. This is received at step 482 and a denial notification is provided to a user of the computing system 110 at step 474.

The methods and systems described above could be extended to accommodate storage of ancillary data associated with a purchase such as merchant identifier, merchant location, item price, receipt identifier, offer identifier (if any promotional offer is applied), date of purchase, manufacturer identifier and consumer identifier. In some example use cases, such as the remote ordering collection scenario described above, such ancillary data could comprise the account identifier and/or the product serial number. Storage of appropriate ancillary data could also enable additional functionality such as warranty transfer when a product is re-sold.

The hashing could comprise operating on ancillary data as well as the product serial number and account identifier. Alternatively or additionally, ancillary data could be written to the distributed data store such that it is linked to the hash. In that case, the hash could act as a passcode for accessing the ancillary data, allowing the ancillary data to be stored securely in the distributed data store. This can be particularly useful where the distributed data store is accessible to some parties who can be permitted access to ancillary data such as purchase price, and some parties who should not. Alternatively or additionally, ancillary data could be stored in a separate data store.

There could be multiple secure distributed data stores available to write hashes to. For example there could be one per product manufacturer. Which data store to write the hashes to could then be determined for example by a manufacturer prefix in the product serial number, or by some ancillary data obtained together with the product serial number and account identifier. Which data store to search can be determined in the same way.

In order to ensure consumers do not encounter problems with the methods described above when changing accounts, or when their account identifier is updated (for example due to a payment card being lost, stolen or expiring), a further secure data store can be provided to map old and new account identifiers to one another. For example such a secure data store could be held and maintained by a server of an issuing bank of the new account identifier. If such an issuer server is a node of the secure distributed data store network then verification requests can be routed through to the issuer server, comprising the product serial number and the new account identifier, so that the issuer server can look up any old account identifiers linked to the new one and search the secure distributed data store for hashes of the product serial number with each of the linked account identifiers. Alternatively, account identifier mappings could be written to the secure distributed data store and all nodes could have access to it, provided they do so in a secure manner, for example by calling a representational state transfer (REST) application programming interface (API).

The product serial number could be globally unique to allow for tracking of individual items within a manufacturer batch. This can be particularly useful for tracking of regulated products such as pharmaceuticals and weapons. For example, if the product serial number is stored as ancillary data to the hash, then when a pharmaceutical product is to be sold the secure distributed data store can be searched for its product serial number to ensure it has not already been sold, thus preventing accidental resale of returned unused pharmaceuticals which should have been destroyed. This system could also allow police or regulatory authorities to obtain a purchase history of seized black market goods, in order to identify how, when and by whom a product was first put onto the black market. Ownership could be tracked using ancillary data such as account and/or consumer identifiers.

The secure distributed data store can be a distributed ledger such as a blockchain, or a distributed database exposing verifiable claims. Some or all of the data stored could be stored with permissioned access restrictions such that only entities with the appropriate permissions can obtain the data.

The hashing algorithm used could for example be SHA-256, which would uniformly distribute the hashes across a 256 bit key space.

The secure distributed data store could be searched using a Cuckoo or Bloom Filter, to confirm when the hash is definitely not present. If this results in a determination that it could be present, a b-tree index could be used to provide a final determination.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

User devices can include, without limitation, static user devices such as PCs and mobile user devices such as smartphones, tablets, laptops and smartwatches.

Receivers and transmitters as described herein may be standalone or may be comprised in transceivers. A communication link as described herein comprises at least one transmitter capable of transmitting data to at least one receiver over one or more wired or wireless communication channels. Such a communication link can optionally further comprise one or more relaying transceivers.

User input devices can include, without limitation, microphones, buttons, keypads, touchscreens, touchpads, trackballs, joysticks and mice. User output devices can include, without limitation, speakers, graphical user interfaces, indicator lights and refreshable braille displays. User interface devices can comprise one or more user input devices, one or more user output devices, or both.

What is claimed is:

1. A computer-implemented verifiable data storage method comprising:
   receiving, by an input device within a network system, a product serial number associated with a purchasable product;
   receiving, by an electronic point-of-sale (POS) device within the network system, an account identifier, wherein said account identifier is used to purchase the purchasable product associated with the product serial number;
   generating a hash by hashing, by one of the electronic POS device and a merchant server within the network system, the product serial number associated with the purchasable product and the account identifier used to purchase the purchasable product according to a non-invertible hashing algorithm; and
   writing, by one of a plurality of nodes in a secure distributed data store within the network system, the hash,
   wherein a computing system, within the network system, subsequently performs a verification process on a basis of the hash for verifying the purchasable product.

2. The method of claim 1, further comprising receiving ancillary data, wherein:
   the hash is produced by hashing the product serial number, the account identifier and the ancillary data; or
   the method further comprises causing the ancillary data to be written to the data store such that it is linked to the hash, optionally such that the ancillary data is passcode protected with the hash as the passcode.

3. The method of claim 1, wherein writing the hash to the secure distributed data store comprises selecting the secure distributed data store from a plurality of secure distributed data stores depending on the product serial number and/or received ancillary data.

4. A computer-implemented verification method comprising:
- receiving, by an input device within a network system, a product serial number associated with a purchasable product;
- receiving, by an electronic point-of-sale (POS) device within the network system, an account identifier, wherein said account identifier is used to purchase the purchasable product associated with the product serial number;
- generating a hash, by hashing, by one of the electronic POS device and a merchant server with the network system, the product serial number associated with the purchasable product and the account identifier used to purchase the purchasable product according to a non-invertible hashing algorithm, wherein a computing system, within the network system, subsequently performs a verification process on a basis of the hash for verifying the purchasable product;
- searching a secure distributed data store for the hash; and
- depending on a result of the searching, providing a confirmation or denial of the hash's presence in the secure distributed data store.

5. The method of claim 4, wherein providing the confirmation or denial is performed by a user output device.

6. The method of claim 4, wherein, when a confirmation is provided, providing the confirmation comprises providing ancillary data which has been stored in the secure distributed data store such that it is linked to the hash, optionally such that the ancillary data is passcode protected with the hash as the passcode.

7. The method of claim 4, wherein searching the secure distributed data store comprises selecting the secure distributed data store from a plurality of secure distributed data stores depending on the product serial number and/or received ancillary data.

8. The method of claim 4, further comprising:
- searching a further secure data store for a record comprising the account identifier and an additional account identifier; and
- in response to finding such a record:
  - producing an additional non-invertible hash by operating on the product serial number and the additional account identifier; and
  - searching the secure distributed data store for the additional hash;

wherein providing a confirmation or denial of the hash's presence in the secure distributed data store is dependent on a result of the searching for both the hash and the additional hash.

9. The method of claim 4, wherein the product serial number is globally unique.

10. A non-transitory computer-readable recording medium having instructions stored thereon which, when executed by one or more processors, causes a processor to execute the method of claims 1 or 4.

11. A computer system configured to perform the method of claim 1.

12. A network system for verifiable data storage, comprising:
- a merchant server;
- a computing system,
- an input device, within the network system, configured to receive a product serial number associated with a purchasable product; and
- an electronic point-of-sale (POS) device, within the network system, configured to receive an account identifier, wherein said account identifier is used to purchase the purchasable product associated with the product serial number,
- wherein one of the electronic POS device and the merchant server, within the network server, generates a hash by hashing the product serial number associated with the purchasable product and the account identifier used to purchase the purchasable product according to a non-invertible hashing algorithm,
- wherein the network system further comprises a secure distributed data store including a plurality of nodes, wherein one of the plurality of nodes writes the hash in the distributed data store, and
- wherein the computing system, within the network system, subsequently performs a verification process on a basis of the hash for verifying the purchasable product.

* * * * *